US007650415B1

(12) United States Patent
Peterson (10) Patent No.: US 7,650,415 B1
(45) Date of Patent: Jan. 19, 2010

(54) GATEWAY FOR CONVERSION OF MESSAGES BETWEEN MULTIPLE PROTOCOLS USING SEPARATE SESSIONS

(75) Inventor: David Peterson, San Jose, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 713 days.

(21) Appl. No.: 10/385,675

(22) Filed: Mar. 10, 2003

(51) Int. Cl.
  G06F 15/16 (2006.01)
  H04L 12/28 (2006.01)
  H04L 12/56 (2006.01)
(52) U.S. Cl. .................. 709/227; 370/401; 709/230
(58) Field of Classification Search .................. None
  See application file for complete search history.

(56) References Cited

U.S. PATENT DOCUMENTS

| | | | | |
|---|---|---|---|---|
| 5,406,557 | A * | 4/1995 | Baudoin | 370/407 |
| 6,570,869 | B1 * | 5/2003 | Shankar et al. | 370/352 |
| 6,680,952 | B1 * | 1/2004 | Berg et al. | 370/467 |
| 6,885,658 | B1 * | 4/2005 | Ress et al. | 370/352 |
| 6,950,441 | B1 * | 9/2005 | Kaczmarczyk et al. | 370/467 |
| 6,965,614 | B1 * | 11/2005 | Osterhout et al. | 370/466 |
| 6,970,909 | B2 * | 11/2005 | Schulzrinne | 709/206 |
| 7,103,067 | B1 * | 9/2006 | Singh et al. | 370/467 |
| 2003/0061385 | A1 * | 3/2003 | Gonze | 709/246 |
| 2003/0076815 | A1 * | 4/2003 | Miller et al. | 370/352 |
| 2005/0002399 | A1 * | 1/2005 | Peterson | 370/392 |

OTHER PUBLICATIONS

Rosenberg et al., "Reliability of Provisional Responses in the Session Initiation Protocol (SIP)" The Internet Society. 14 pages, (2002).
Rantapuska, "SIP Call Security in an Open IP Network", Helsinki University of Technology, Telecommunications Software and Multimedia Laboratory, May 28, 2003, 14 pages.

* cited by examiner

Primary Examiner—John B. Walsh
(74) Attorney, Agent, or Firm—Townsend and Townsend and Crew (57) ABSTRACT

A method for providing messaging between a first communication device and a second communication device using a gateway is provided. The method comprises: receiving a first message from the first communication device addressed to the gateway; initiating a first session with the first communication device; initiating a second session with the second communication device; and sending a second message corresponding to the first message to the second communication device in the second session.

42 Claims, 5 Drawing Sheets

GATEWAY FOR CONVERSION OF MESSAGES BETWEEN MULTIPLE PROTOCOLS USING SEPARATE SESSIONS

CROSS-REFERENCES TO RELATED APPLICATIONS

The present application is related to U.S. patent application Ser. No. 10/386,212 entitled "Reliable Call Progress Indication For SIP," filed on Mar. 10, 2003, which is hereby incorporated by reference, as if set forth in full in this document, for all purposes.

BACKGROUND OF THE INVENTION

The present invention generally relates to data communications and more specifically to a system and method for providing messaging between a first communication device and a second communication device in separate sessions.

Many different telephony protocols exist. For example, devices may be communicating in any combination of a session initiation protocol (SIP), channel associated signaling (CAS), integrated services digital network (ISDN), signaling system 7 (SS7), CAS Ear and Mouth (E&M), CAS E&M revision 2 (R2), H.323, or any other non-ISDN like protocol. Each of these protocols provide different messages that are sent between devices. With various devices configured to communicate in different protocols, the situation where devices communicating in different protocols must communicate is likely to happen. In most cases, messages from one protocol do not directly map to messages in another protocol. That is, the protocols do not simply send messages with essentially the same meaning at the same time in which case all that would be needed is a direct translation from one syntax to another. Accordingly, in order for devices operating a different telephony protocols to communicate, a proxy or gateway is needed that includes definitions and complicated coding to define how to translate from every supported protocol to every other supported protocol. In other words, if there are three supported protocols, #1, #2, and #3, there must be separate translations from protocol #1 to protocols #2 and #3; from protocol #2 to protocols #1 and #3; and from protocols #3 to protocols #1 and #2. Thus, a geometric fan-out of translations for each supported protocol is required.

The above approach includes many disadvantages. For example, in the case of a SIP protocol, a SIP conversion is typically only described for conversion to and from modern protocols such as SS7 and to protocols as old as ISDN. There are no provisions at all for conversion from SIP to CAS E&M, CAS R2, or any other non-ISDN protocol older than ISDN. Thus, providing the needed definitions and coding to convert from SIP to an older protocol would require many man hours and large amounts of money. Additionally, because each supported protocol must be translated between every other supported protocol, the amount of coding and definitions needed is large and expensive to maintain and support.

Also, even if the needed definitions and coding for the translation are implemented, when two devices communicate, a session is created where the devices communicate directly. Thus, both devices need to know the identity of each other because they must send messages directly to each other. With security being a growing concern among entities, communicating through a single session is undesirable because some entities would like to keep their identity anonymous to the other device.

BRIEF SUMMARY OF THE INVENTION

Embodiments of the present invention generally relate to providing communications between two device in separate sessions.

In one embodiment, a method for providing messaging between a first communication device and a second communication device using a gateway is provided. The method comprises: receiving a first message from the first communication device addressed to the gateway; initiating a first session with the first communication device; initiating a second session with the second communication device; and sending a second message corresponding to the first message to the second communication device in the second session.

In another embodiment, a method for providing messaging between a first communication device and a second communication device using a gateway is provided. The method comprises: initiating a first session with the first communication device; receiving a first message in a first format from the first communication device addressed to the gateway; translating the first message to a second message in a second format; initiating a second session with the second communication device; and sending a third message in a third format, the third message generated using the second message, to the second communication device in the second session, wherein the third message corresponds to the first message.

A further understanding of the nature and the advantages of the inventions disclosed herein may be realized by reference of the remaining portions of the specification and the attached drawings.

DETAILED DESCRIPTION OF THE INVENTION

Figure 1:
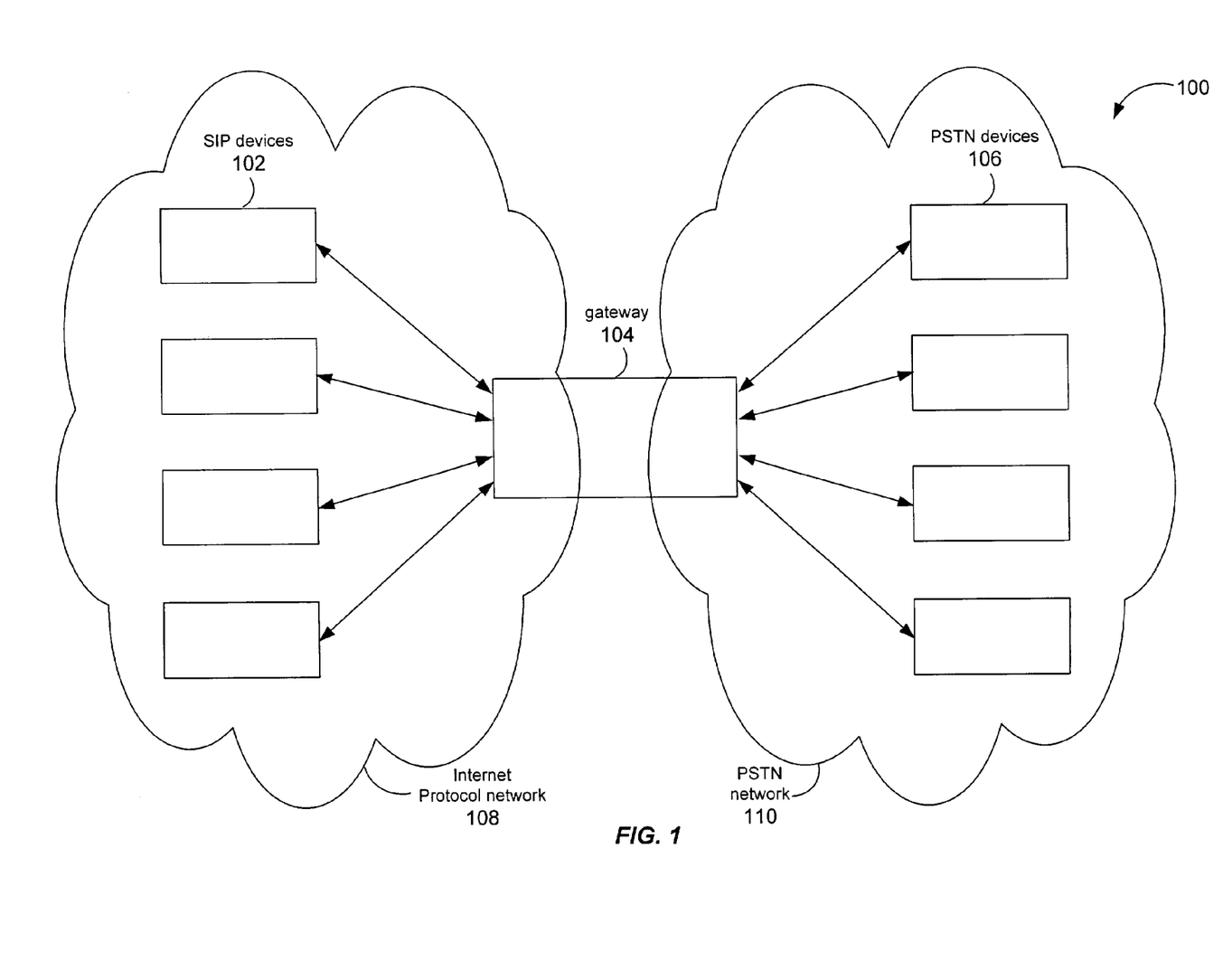
FIG. 1 depicts a simplified block diagram of a communications system that enables messaging between devices according to one embodiment of the present invention.

FIG. 1 depicts a simplified block diagram of a communications system 100 that enables messaging between devices according to one embodiment of the present invention. System 100 includes IP devices 102, a gateway 104, and PSTN devices 106. IP devices 102 are situated on an Internet Protocol (IP) network 108 and public switched telephone network (PSTN) devices 106 are situated on a PSTN network 110. IP devices 102 communicate in an IP protocol, such as SIP, H.323, or any other protocol compatible with an IP network. PSTN devices 106 communicate in a PSTN protocol, such as CAS E& M, CAS R2, ISDN, SS7, or any other protocol compatible with a PSTN network. Although embodiments of the present invention will be described as using IP devices 102 and PSTN devices 106, it will be understood that any other device compatible with an IP network 108 or PSTN network 110 may be used. Also, IP network 108 may be any packet switched network and it will be understood that networks other than the IP network 108 may be used, such as a wireless network, a local area network (LAN), a wide area network (WAN), an asynchronous transfer mode (ATM) network, a frame relay network, etc.

IP devices 102 may be any device that enables communication with another IP device 102 or a PSTN device 106. For example, IP device 102 may be an IP telephone, a switch as connected to an IP telephone, an IP proxy, an IP agent for an IP telephone, etc.

PSTN devices 106 include any device that enables communication between another PSTN device 106 or IP device 102. For example, PSTN devices 106 may include a switch, a PSTN telephone, an agent for a PSTN telephone, a PSTN proxy, etc.

Gateway 104 acts as a gateway for communications between devices in network 108 and network 110. Gateway 104 facilitates messaging between devices according to teachings described below. An example of devices communicating through gateway 104 is depicted in FIG. 2.

Figure 2:
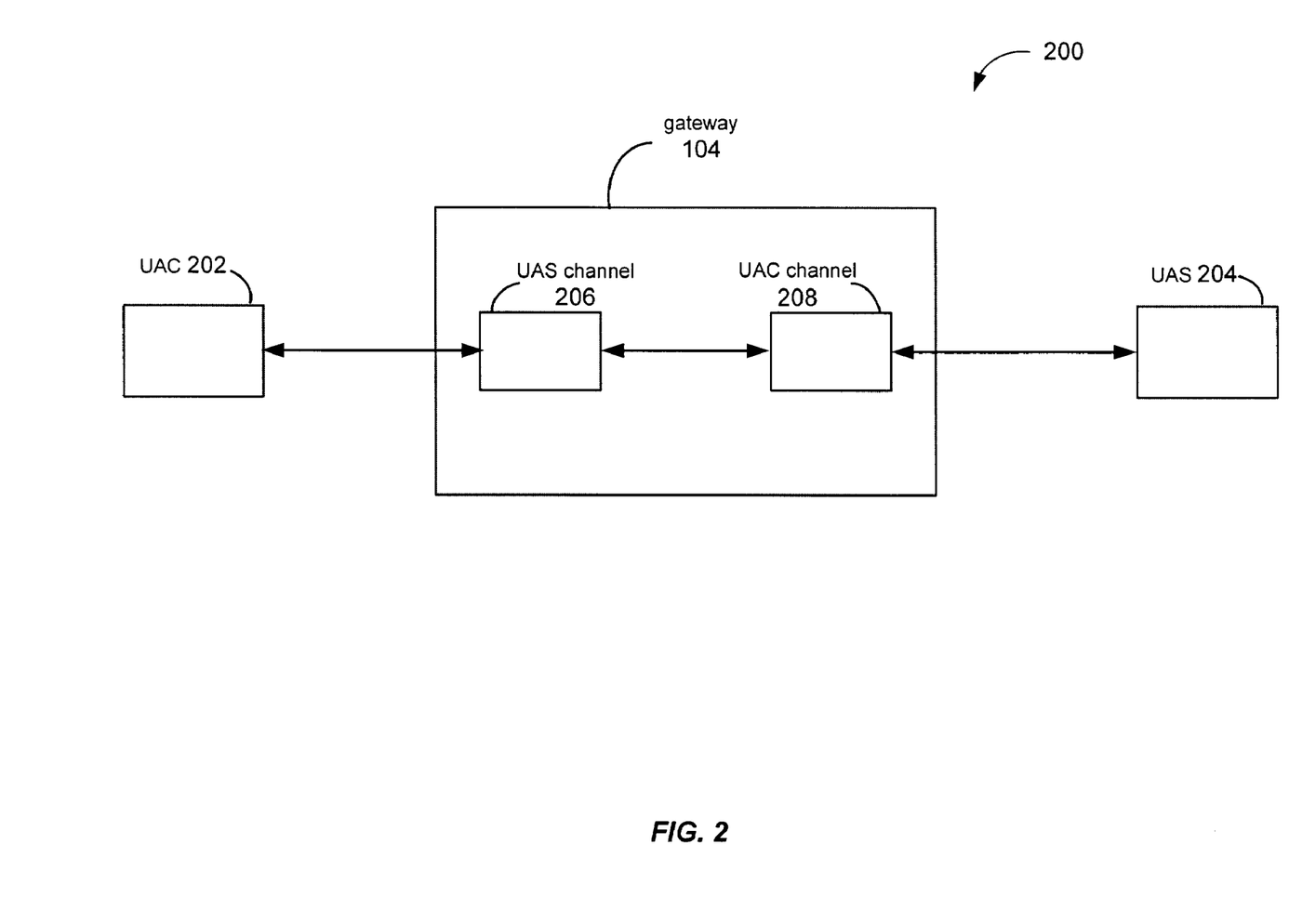
FIG. 2 illustrates an embodiment of a system of a first device connecting with a second device through a gateway.

FIG. 2 illustrates a system 200 of a first device connecting with a second device through gateway 104. The first device is referred to as a user agent client (UAC) 202 and the second device is referred to as a user agent server (UAS) 204. UAC 202 communicates with UAS 204 through a UAS channel 206 and a UAC channel 208. UAC 202 is the device that initiates a communication or telephone call with UAS 204. In one embodiment, UAC 202 may be either an IP device 102, a PSTN device 106, or any other communication device, such as IP phone, computer, etc. UAS 204 is referred to as a server and receives the initial communication from UAC 202. Thus, UAC 202 is in effect calling UAS 204. In one embodiment, UAC 102 may be either an IP device 102 or a PSTN device 106 or any other communication device, such as an IP phone, computer, etc.

When UAC 202 first communicates with gateway 104, gateway 104 determines where to route the communication. Once that is determined, gateway 104 opens a first session between UAS channel 206 and UAC 202 and a second session between UAC channel 208 and the destination, in this case, UAS 204. Thus, when messages are received at gateway 104 from either UAC 202 or UAS 204, UAS channel 206 and UAC channel 208 act as if they were the destination for the messages. Thus, UAS channel 206 acts as if it is UAS 204 or, for example, an IP or PSTN device and UAC channel 208 acts as if it is UAC 202 or, for example, an IP or PSTN device. Gateway 104 appears to UAC 202 and UAS 204 as a UAS or UAC. Accordingly, gateway 104 is not a router or proxy but rather acts as an end device for communications from UAC 202 and UAS 204.

UAC 202, in the first session, communicates messages that will be sent to UAS 204 in a first protocol. The messages are addressed to gateway 104. Gateway 104 will then determine where the messages should be sent. For example, the messages may include information, such as header information, that is used to determine where to send the message. UAC 202, however, does not send the messages to a location associated with UAS 204; rather, UAC 202 sends the message to gateway 104 and gateway 104 determines where to send the messages.

The messages in the first protocol are received at UAS channel 206, which then translates the messages into a format specific to gateway 104. For example, the gateway format may be a generic format that all protocols supported by gateway 104 may be translated into. The translated messages are then sent to UAC channel 208.

When UAC 202 first communicated with gateway 104 and the first session is created, gateway 104 determines a UAS that the first communication should be sent and creates a second session between UAC channel 208 and UAS 204. This determination may be made using information in the message, such as header information. The first and second sessions are distinct from each other and separate. Thus, although UAC 202 will be communicating with UAS 204, they will not know each other's identities because UAS channel 206 and UAC 202 will be communicating in one session and UAC channel 208 and UAS 204 will be communicating in a second separate session. Additionally, UAC 202 and UAS 204 will be unaware that separate sessions have been created by gateway 104.

When a translated message is received at UAC channel 208, UAC channel 208 can determine a message in the protocol that is supported by UAS 204 from the translated message. The translated message is then converted into a message in the protocol supported by UAS 204 and sent to UAS 204.

UAS channel 206 and UAC channel 208 operate independently of each other. Therefore, each side of a communication only needs to know how to communicate in one protocol and does not have to be aware of what the protocol being used on the other side of the communication. This is because each channel will receive messages in the gateway format and thus will only need to perform one translation between the gateway format to the protocol in which the end device communicates; multiple translations between multiple protocols are not needed. Thus, different protocols may be supported by gateway 104; also, additional protocols may be added to the supported protocols of gateway 104 without providing translations between the new protocol and all the supported protocols. Thus, if a new protocol is added, the protocol would only have to be translated into the gateway format. Conventionally, the new protocol would have to be translated into every format that is supported by gateway 104. Using the gateway format to communicate between UAS channel 206 and UAC channel 208 thus eliminates translating every protocol to every single supported protocol.

Also, UAC channel 208 may, at times, communicate with UAS 204 on its own accord without being prompted by messages originating from UAC 202. Activities such as maintenance of the session are typically conducted in an entirely independent manner rather than being motivated by translation of messages from the other session. Thus, UAC channel 208 is designed to function as an end device for UAS 204 and includes functions other than what is typically needed for just passing messages between the two sessions and UAS 204 and UAC 202. Some of these functionalities in one session are performed independently from the other session. Similarly, UAS channel 206 may engage in activities with UAC 202 in an independent fashion which is not motivated by or communicated to UAS 204.

Figure 3:
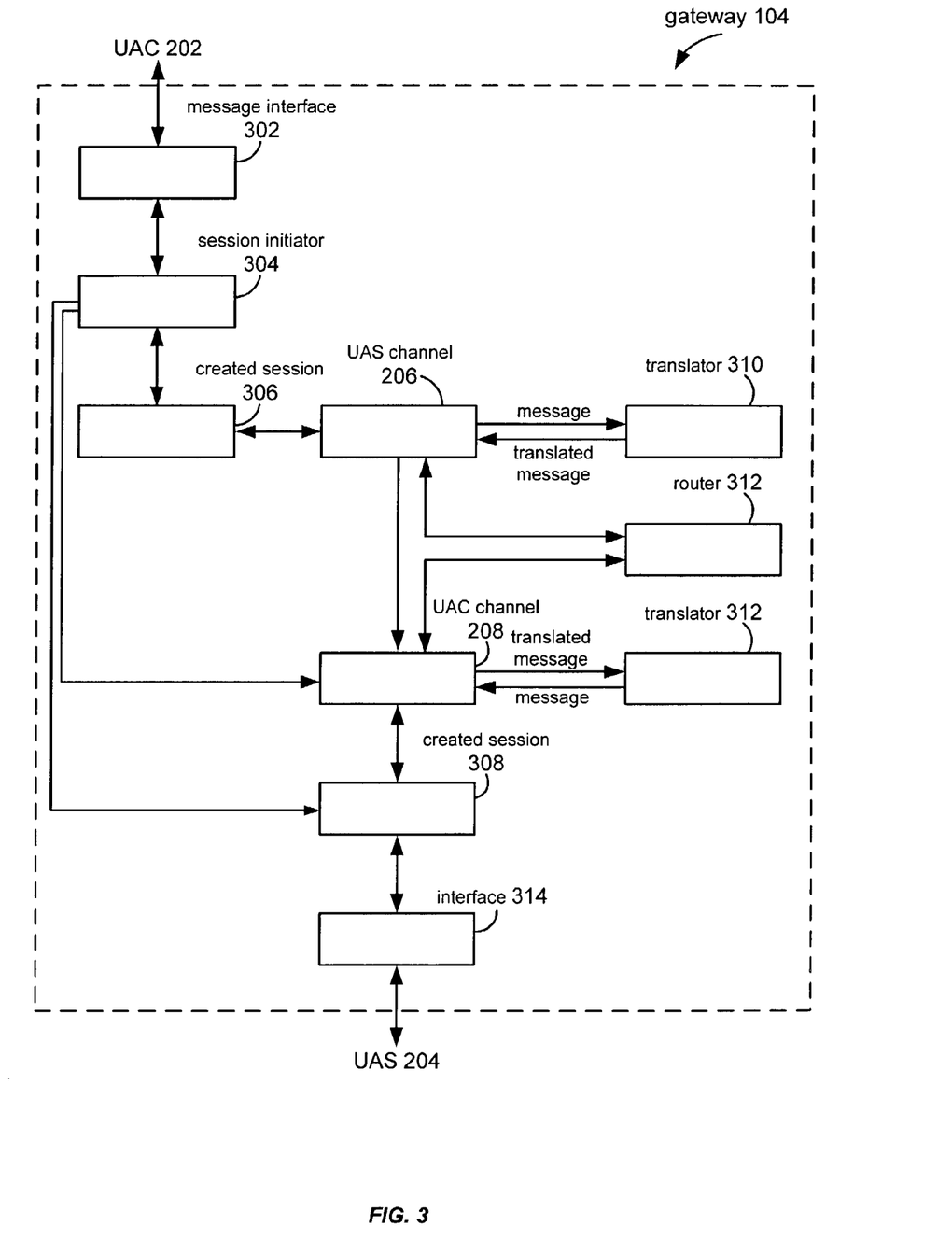
FIG. 3 illustrates an embodiment of the gateway for enabling communications between first device and the second device according to one embodiment of the present invention.

FIG. 3 illustrates an embodiment of gateway 104 for enabling communications between UAC 202 and UAS 204 according to one embodiment of the present invention. The communications will be described with respect to a message communicated from UAC 202 to UAS 204; however, it will be understood that the teachings may be used for communications from UAS 204 to UAC 202.

UAC 202 initiates a communication for UAS 204 by sending a message addressed to gateway 104 that will be communicated to UAS 204. Gateway 104 receives the message at interface 302. In one embodiment, the message is routed to gateway 104 because the message includes an IP address of gateway 104. Also, in other embodiments, the message is routed to gateway 104 by virtue of being physically linked to UAC 202 by a device such as a cable (e.g., T1 or E1 line). In one embodiment, interface 302 may be a hardware/software interface/abstraction layer interface (HSI/AL) if the message was sent in a SIP protocol or a CAS/HSI interface if the message was sent in a CAS protocol. Interface 302 then determines the UAS channel destination for the messages, in this case, interface 302 determines the destination is UAS channel 206.

The message is then sent to a session initiator 304, which initiates a first session 306. Session 306 is a session in which UAS channel 206 and UAC 202 will communicate in. A second session in which UAC channel 208 and UAS 204 will also be created as described below.

UAS channel 206 receives the message and communicates with a translator 310 in order to have the message translated. It will be understood that translator 310 may be a separate entity from UAS channel 206 or UAS channel 206 may include the functionality of translator 310. As mentioned above, the message is translated into a generic format, for example, a proprietary format specific to gateway 104. Once the message is translated, UAS channel 206 communicates with a router 312 to determine where to route the translated message. Router 312 determines the proper UAC channel 208 in which UAS channel 206 should be communicating. The proper UAC channel 208 is communicated to UAS channel 206 and when received, UAS channel 206 communicates the translated message directly to the proper UAC channel 208 (peer-to-peer communications). In other embodiments, communications between UAS channel 206 and UAC channel 208 may be through other methods, such as through agents or other devices.

When UAC channel 208 receives the translated message, it communicates with session initiator 304 to create a second session 308. It will be understood that UAC channel 208 may also create session 308 itself. UAC channel 208 then sends the message to a translator 312, and receives a message back from translator 312 that is in a format compatible with the protocol that is supported by UAS 204. It will be understood that translator 312 and translator 310 may be the same translator because it is not necessary that separate translators be used. Also, it will be understood that translator 312 may be a separate entity from UAC channel 208 or UAC channel 208 may include the functionality of translator 312.

After receiving the translated message in the protocol compatible with UAS 204, the message is sent to an interface 314. The message is then sent through interface 314 to UAS 204. Interface 314 may perform any well known functions that are required to send messages to UAS 204.

Accordingly, from the above, a translated message is used to communicate between UAS channel 206 and UAC channel 208. Even though UAS channel 206 and UAC 202 may be communicating in a different protocol than UAC channel 208 and UAS 204, UAS channel 206 and UAC channel 208 do not need to know the protocol that each other is communicating in. Also, because separate sessions are created, UAS 204 and UAC 202 do not know each other's identity and are separated. In fact, UAS 204 communicates messages directed to UAC channel 208, and UAC 202 communicates messages directed to UAS channel 206. Accordingly, the protocols that are being communicated by UAS channel 206 or UAC channel 208 may be varied with each channel only needing to know how to translate from a specific protocol to the generic format supported by gateway 104. Also, UAC 202 and UAS 204 communicate messages addressed to gateway 104 and gateway 104 determines where to send the messages.

Figure 4:
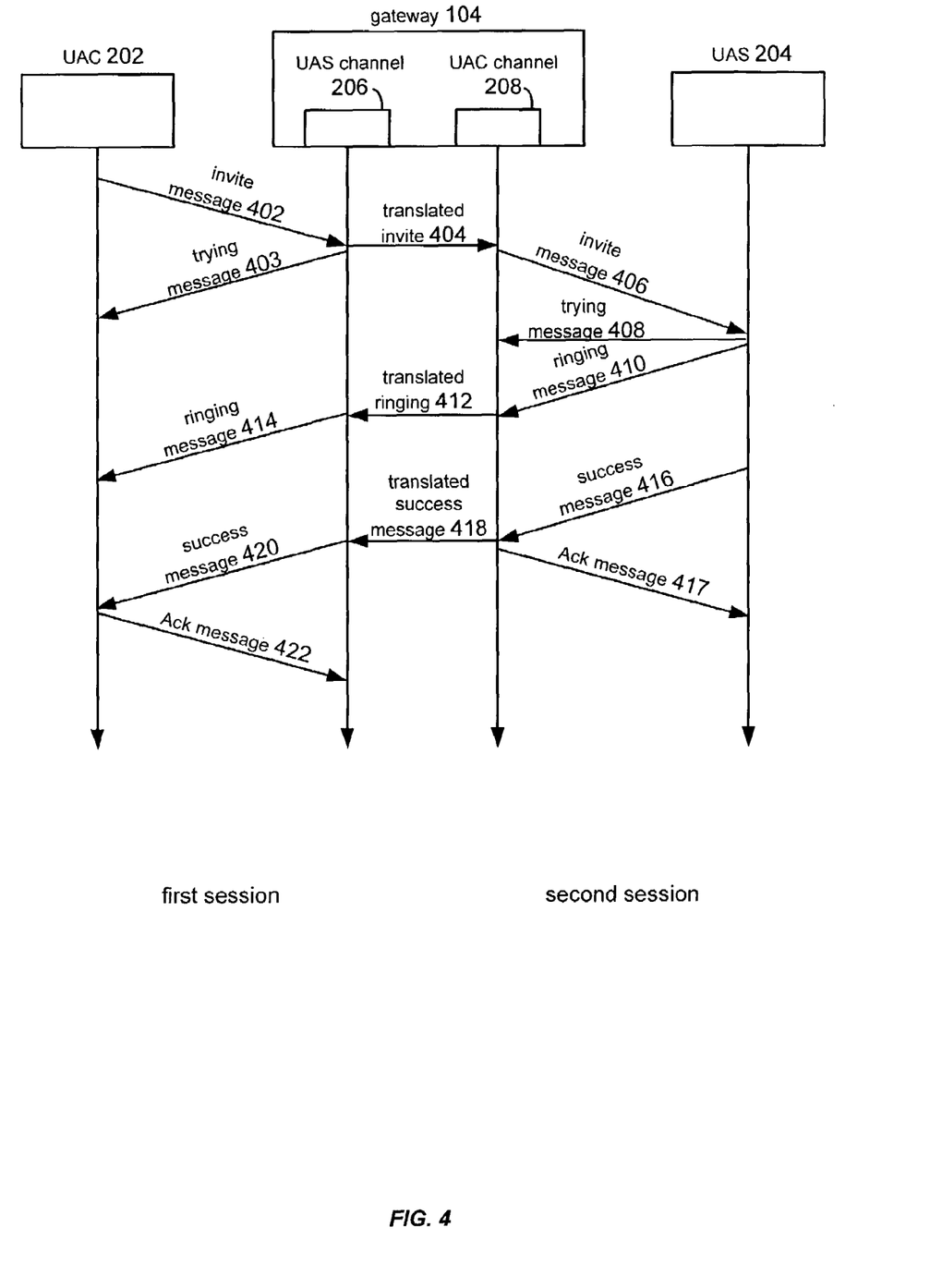
FIG. 4 illustrates a sequence of messages communicated among the first device, the gateway, and the second device according to an embodiment of the present invention.

FIG. 4 illustrates a sequence of messages communicated among UAS 202, gateway 104, and UAS 204 according to an embodiment of the present invention. In FIG. 4, as arrows move down from top to bottom, it will be understood that time has elapsed. The messages communicated between UAC 202 and UAS 204 correspond to messages found in a SIP protocol. Although the following sequence of messages is described using messages found in a SIP protocol; however, it will be understood that any protocol and corresponding messages may be used.

UAC 202 first sends an invite message 402 addressed to gateway 104. Invite message 402 may be any message that indicates that UAC 202 is trying to initiate a communication. In one embodiment, invite 402 is an invite message as found in the SIP protocol. Gateway 104 receives the message at UAS channel 206. UAS channel 206 acts like it is UAS 204 to UAC 202. Gateway 104 opens up a first session using UAS channel 206 that is between UAC 202 and UAS channel 206. Gateway 104 also creates a second session between UAC channel 208 and UAS 204. UAC channel 208 now acts as a UAC to UAS 204. UAS channel 206 then communicates a trying message 403 back to UAC 202. In one embodiment, trying message 403 is a 10× trying message as found in the SIP protocol. Typically, the invite message would have been sent to UAS 204 and UAS 204 would have sent a trying message back to UAC 202. Because a first session has been created between UAS channel 206 and UAC 202 where UAS channel 206 is acting as a UAS for UAC 202, UAS channel 206 can send the trying message 403 back to UAC 202 without receiving a trying message from UAS 204.

The message is translated into a translated invite message 404 and sent to UAC channel 208. The message is then translated from translated invite 404 to an invite message 406, which is in the format of the protocol UAS 204 communicates in. Invite message 406 is then communicated to UAS 204. In one embodiment, invite 406 is an invite message as found in the SIP protocol.

When UAS 204 receives invite 406, UAS 204 sends a trying message 408 addressed to gateway 104. Trying message 408 may be any message that indicates that UAS 204 is trying to initiate the communication. In one embodiment, trying message 408 is a 10× trying message as found in the SIP protocol. UAC channel 208 receives trying message 408 and suppresses it. The trying message 408 is suppressed because UAS channel 206 has already sent trying message 403 back to UAC 202. Although trying message 408 is suppressed, it will be understood that trying message 408 may be translated, sent to UAS channel 206, and then sent to UAC 202.

When UAS 204 begins to ring, UAS 204 sends a ringing message 410 to gateway 104. Ring message 410 may be any message that indicates that UAS 204 is ringing. In one embodiment, ringing message 410 is a 18× ringing message as found in the SIP protocol. For example, ringing message 410 may be a 180 ringing or a 183 audio inband response message. When ringing message 410 is received by UAC channel 208 and translated into a generic format for gateway 104. For example, ringing message 410 is translated into translated ringing message 412 and send to UAS channel 206. UAS channel 206 then translates translated ringing message 412 into a corresponding message in the format that UAC 202 communicates in. For example, UAS channel 206 communicates translated ringing message 412 into a ringing message 414. In one embodiment, ringing message 414 is a 18× ringing message as found in the SIP protocol such as a 180 ringing response message or a 183 inband audio response message.

When a user picks up UAS 204, UAS 204 sends a success message 416. Success message 416 may be any message that indicates that UAS 204 has been picked up. In one embodiment, success message 416 is a 20× success message as found in the SIP protocol, such as a 200 success message. UAC channel 208 receives success message 416 and translates it into a translated success message 418. Translated success message 418 is then communicated to UAS channel 206, which translates message 418 into a corresponding message compatible with a format that UAC 202 communicates in. For example, a success message 420 is determined and communicated to UAC 202. In one embodiment, success message 420 is a 20× success message as found in the SIP protocol, such as a 200 success message. When UAC channel 208 receives success message 416, UAC channel 208 sends an acknowledgment (ACK) message 417 to UAC 204. The acknowledgment indicates to UAS 204 that UAC 202 has received the success message.

When UAC 202 receives success message 420, UAC 202 communicates an acknowledgment message 422 to gateway 104. UAS channel 206 then receives ACK 422.

In the above method, UAC 202 and UAS channel 206 communicate in a first session and UAC channel 208 and UAS 204 communicate in a second session. UAS channel 206 and UAC channel 208 communicate messages between each other in a generic format for gateway 104. Messages received from UAC 202 and UAS 204 are translated into this format. Accordingly, by maintaining separate sessions, identities of communicating devices are anonymous and may be in any format suggested by gateway 104. New formats may also be added to gateway 104 without translation to each format supported by gateway 104.

In one embodiment, gateway 104 may process the call progress messages described above using system and methods found in U.S. patent application Ser. No. 10/386,212 entitled "Reliable Call Progress Indication For SIP," filed on Mar. 10, 2003, which is hereby incorporated by reference, as if set forth in full in this document, for all purposes.

Figure 5:
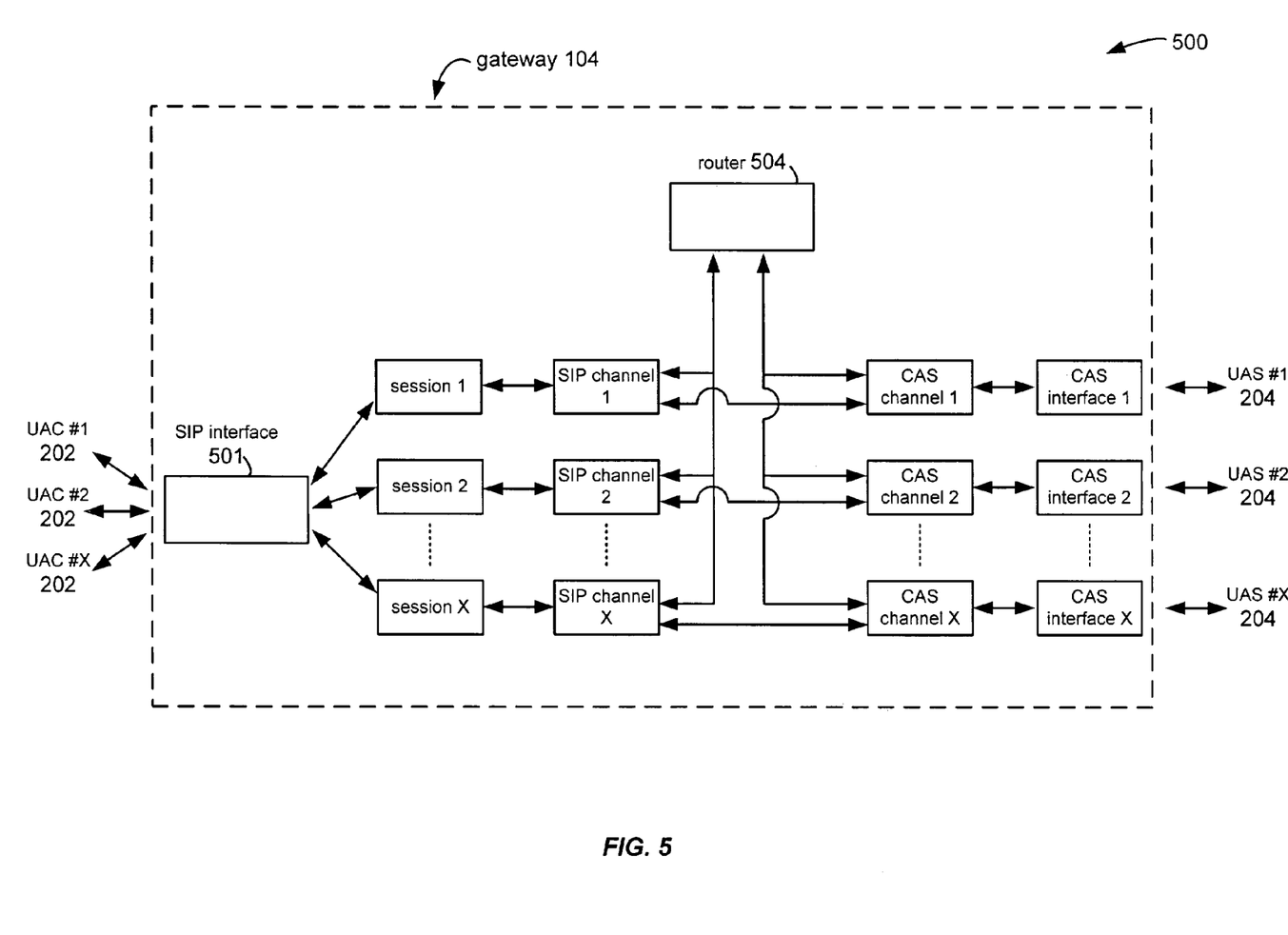
FIG. 5 illustrates an embodiment of a system illustrating communications between a plurality of devices communicating in a SIP protocol and a plurality of devices communicating in a CAS protocol in one embodiment of the present invention.

FIG. 5 illustrates an embodiment of a system 500 illustrating communications between a plurality of UACs 202 communicating in a SIP protocol and a plurality of UASs 204 communicating in a CAS protocol in one embodiment of the present invention. It will be understood that SIP and CAS are used for explanation purposes only and that other protocols may be used. Communications from one of the plurality of UACs 202 are received at a SIP interface 501. SIP interface 501 is configured to receive communications in a SIP protocol. Also included are CAS interface 1, CAS interface 2, . . . , CAS interface X, which are configured to receive communications from the individual UASs 204 in a CAS protocol. Because of the nature of the CAS protocol, a separate interface is required for each UAS that communicates with a CAS interface.

When a message is sent from a UAC 202, the message is received at SIP interface 501. SIP interface 501 then determines a SIP channel to communicate the message to.

Accordingly, SIP interface 501 determines the appropriate session out of session 1, session 2, . . . , session X and the appropriate SIP channel out of SIP channel 1, SIP channel 2, . . . , SIP channel X. If an appropriate session is not found, a new session may be created. When a message is received at a SIP channel, the SIP channel communicates with a router 504. Router 504 is used to determine where the SIP channel should send the message. In one embodiment, the SIP channel and the CAS channel communicate in a peer-to-peer relationship.

The message received at SIP channel 1 is then translated into a generic format specific to gateway 104. The translated message is sent to CAS channel 1, which then translates the translated message into a CAS format. The CAS channel then communicates the message to an associated CAS interface, which then forwards the CAS message to a UAS 204.

In one example using system 500, UAC #1 202 communicates a message in a SIP protocol to gateway 104. SIP interface 501 receives the message and determines that the message is for session 1 and SIP channel 1. Accordingly, SIP interface 501 sends the SIP message in session 1 to SIP channel 1.

When SIP channel 1 receives the SIP message, it communicates with router 504 to determine an appropriate channel that should receive the SIP message. Information in router 504 indicates that CAS channel 1 should receive the SIP message. The SIP message, however, is not sent to CAS channel 1. Rather, SIP channel 1 translates the SIP message into a generic format for gateway 104 and sends the translated message to CAS channel 1. CAS channel 1 receives the translated message and translates it into a CAS format. The message in the CAS format is then sent to CAS interface 1, which sends the CAS message to UAS #1 204.

It will be understood that any CAS channel 1 or SIP channel 1 may be replaced by a channel compatible with the format other than CAS and SIP. If a new channel is included, a translation from the new format to the generic format is needed. Translations, however, between the new format and SIP and the new format and CAS format are not necessary. Accordingly, new formats may be added without requiring translations to all supported formats of gateway 104.

It should be understood that the present invention as described above can be implemented in software, hardware, or a combination of both, in the form of control logic in a modular or integrated manner. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. For example, communications between protocols other than SIP and CAS, such as SS7, CAS E&M, CAS R2, ISDN, and other protocols, may be enabled. The scope of the invention should, therefore, be determined not with reference to the above description, but instead should be determined with reference to the pending claims along with their full scope or equivalents.

What is claimed is:

1. A method for providing voice call messaging between a first communication device involving a first message and a second communication device involving a second message using a gateway, the method comprising:

initiating a first session with the first communication device according to a first communication protocol, wherein the gateway and the first communication device exchange messages having voice call data in the first session;

receiving the first message from the first communication device in the first session, the first message being addressed to the gateway;

initiating a second session with the second communication device according to a second communication protocol such that the second session exists concurrently with the first session, wherein the gateway and the second communication device exchange messages having voice call data in the second session;

translating the first message into a third message;

generating the second message using the third message;

sending the second message corresponding to the first message to the second communication device in the second session;

receiving a fourth message from the second communication device in the second session; and maintaining the first and second sessions for a duration of the voice call independently of the messages exchanged between the first and second communication devices, wherein the third message comprises a third data format different from a data format of the first message and a data format of the second message.

2. The method of claim 1, wherein the first message is received at a first channel and the second message is sent by a second channel.

3. The method of claim 2, further comprising determining where to route the received first message prior to initiating the first session, wherein the determination indicates that the message should be routed to the second channel from the first channel.

4. The method of claim 1, further comprising determining from the first message addressed to the gateway that it should be sent to the second communication device.

5. The method of claim 1, wherein the first message is at least one of an IP protocol and a PSTN protocol and the second message is at least one of an IP protocol and a PSTN protocol.

6. The method of claim 5, wherein the IP protocol comprises at least one of a SIP protocol and H.323 protocol and wherein the PSTN protocol comprises at least one of CAS E & M, CAS R2, ISDN, and SS7.

7. The method of claim 1, wherein the first message comprises a first invite message.

8. The method of claim 7, wherein the second message comprises a second invite message.

9. The method of claim 1, further comprising sending a first trying message to the first communication device in response to the first message in the first session.

10. The method of claim 9, further comprising receiving a second trying message from the second communication device in the second session in response to the second message.

11. The method of claim 1, further comprising receiving a first ringing message from the second communication device in the second session.

12. The method of claim 11, further comprising sending a second ringing message to the first communication device in response to receiving the first ringing message in the first session.

13. The method of claim 1, further comprising receiving a first success message from the second communication device in the second session.

14. The method of claim 13, further comprising sending a first acknowledgment message to the second communication device in response to receiving the first success message in the second session.

15. The method of claim 14, further comprising sending a second success message to the first communication device in response to the first success message in the first session.

16. The method of claim 15, further comprising receiving a second acknowledgement message from the first communication device in the first session.

17. An apparatus for providing voice call messaging between a first communication device and a second communication device, the apparatus comprising:

a first session initiator configured to initiate a first session with the first communication device according to a first protocol, wherein the apparatus and the first communication device exchange messages having voice call data in the first session;

a first channel configured to receive a first message, from the first communication device, addressed to the apparatus in the first session;

a second session initiator configured to initiate a second session with the second communication device according to a second protocol, wherein the apparatus and the second communication device exchange messages having voice call data in the second session and the second session exists concurrently with the first session;

a second channel configured to send a second message corresponding to the first message to the second communication device in the second session and to receive a fourth message from the second communication device, the fourth message being comprising voice call data for the first communication device and being received in the second session; and a router, wherein the router includes information usable by the first and second channels so a third message corresponding to the first message can be communicated in between the first and second channels, wherein the apparatus converts the first message to the third message in the first session and converts the third message to the second message in the second session, the third message having a format different from the first and second messages, and wherein the first session initiator maintains the first session and the second session initiator maintains the second session for a duration of the voice call independently of the messages exchanged between the first and second communication devices.

18. The apparatus of claim 17, further comprising logic to determine that the first message addressed to the apparatus should be sent to the second communication device.

19. The apparatus of claim 17, wherein the third message is communicated through a peer-to-peer relationship between the first and second channels.

20. The apparatus of claim 17, wherein the first channel acts as a user agent server for the first communication device.

21. The apparatus of claim 17, wherein the second channel acts as a user agent client for the second communication device.

22. The apparatus of claim 17, wherein the first communication device communicates in a SIP protocol and the second communication device communicates in a CAS protocol.

23. The apparatus of claim 17, wherein the first communication device communicates in at least one of an IP protocol and a PSTN protocol and the second communication device communicates in at least one of an IP protocol and a PSTN protocol.

24. The apparatus of claim 23, wherein the IP protocol comprises at least one of a SIP protocol and H.323 protocol and wherein the PSTN protocol comprises at least one of CAS E & M, CAS R2, ISDN, and SS7.

25. A gateway for providing voice call messaging between a first communication device and a second communication device, wherein the first communication device communicates in a first format and the second communication device communicates in a second format, the gateway comprising:

a first session initiator configured to initiate a first session, wherein the gateway and the first communication device exchange messages having voice call data in the first session;

a first channel configured to receive a first message in the first format from the first communication device addressed to the gateway in the first session;

a first translator configured to receive the first message from the first channel, to translate the first message in the first format to a third message in a third format, and to deliver the third message to the first channel in the first session;

a second session initiator configured to initiate a second session, wherein the gateway and the second communication device exchange messages having voice call data in the second session the second session exists concurrently with the first session; and a second channel configured to receive the third message from the first channel in the third format;

a second translator configured to receive the third message from the second channel, to translate the third message to a second message in the second format, and to deliver the second message to the second channel in the second session, wherein the second channel sends the second message to the second device in the second session, and the third format is different from the first format and the second format, and wherein the first session initiator maintains the first session and the second session initiator maintains the second session for a duration of the voice call independently of the messages exchanged between the first and second communication devices.

26. The gateway of claim 25, wherein the first communication device communicates in at least on of an IP protocol and a PSTN protocol and the second communication device communicates in at least one of an IP protocol and a PSTN protocol.

27. The gateway of claim 26, wherein the IP protocol comprises at least one of a SIP protocol and H.323 protocol and wherein the PSTN protocol comprises at least one of CAS E & M, CAS R2, ISDN, and SS7.

28. The gateway of claim 25, further comprising logic to determine that the first message addressed to the apparatus should be sent to the second communication device.

29. The gateway of claim 25, further comprising a router, wherein the router includes information usable by the first and second channels so the third message can be communicated in between the first and second channels.

30. The gateway of claim 29, wherein the third message is communicated through a peer-to-peer relationship between the first and second channels.

31. The gateway of claim 25, wherein the first channel acts as a user agent server for the first communication device.

32. The gateway of claim 25, wherein the second channel acts as a user agent client for the second communication device.

33. The gateway of claim 25 wherein the first translator converts messages between the first and third protocols only and the second translator converts messages between the second and third protocols only.

34. A method for providing voice call messaging between a first communication device and a second communication device using a gateway, the method comprising:

initiating a first session with the first communication device, wherein the gateway and the first communication device exchange messages having voice call data in the first session;

receiving a first message in a first format from the first communication device addressed to the gateway;

translating the first message to a second message in a second format;

initiating a second session with the second communication device, wherein the gateway and the second communication device exchange messages having voice call data in the second session and the second session exists concurrently with the first session;

sending a third message to the second communication device in the second session, the third message being generated from the second message and having a format different from the first message and the second message;

receiving a fourth message from the second communication device in the second session; and maintaining the first and second sessions for a duration of the voice call independently of the messages exchanged between the first and second communication devices.

35. The method of claim 34, further comprising:

translating the fourth message to a fifth message in the third format; and sending a sixth message in the first format, the sixth message generated using the fifth message, to the first communication device in the first session, wherein the sixth message corresponds to fourth message.

36. The method of claim 35, further comprising determining from the first message addressed to the gateway that it should be sent to the second communication device.

37. The method of claim 34, wherein the first message is received at a first channel and the third message is sent by a second channel.

38. The method of claim 37, further comprising determining where to route the received first message, wherein the determination indicates that the message should be routed to the second channel from the first channel.

39. The method of claim 34, wherein the first message is at least one of an IP protocol and a PSTN protocol and the third message is at least one of an IP protocol and a PSTN protocol.

40. The method of claim 39, wherein the IP protocol comprises at least one of a SIP protocol and H.323 protocol and wherein the PSTN protocol comprises at least one of CAS E & M, CAS R2, ISDN, and SS7.

41. An apparatus for providing messaging, the apparatus comprising:

a first communication device;

a first channel configured to receive a first message in a first format from the first communication device, wherein the apparatus and the first communication device exchange messages having voice call data in a first session;

a second communication device;

a second channel configured to send a second message in a second format to the second communication device, wherein the apparatus and the second communication device exchange having voice call data in a second session;

a translator configured to translate the first message in the first format to a translated message in a third format different from the first format and the second format and to deliver the translated message to the first channel; and wherein the second channel receives the translated message in the third format from the first channel and obtains from the translator the second message in the second format based on the translated message in the third format, and wherein the apparatus initiates the second session such that second session exists concurrently with the first session, and maintains the first and seconds sessions independently of the first and second messages respectively.

42. The apparatus of claim 41, wherein the first communication device is separated from the second communication device.

* * * * *

UNITED STATES PATENT AND TRADEMARK OFFICE
CERTIFICATE OF CORRECTION

PATENT NO.         : 7,650,415 B1                                         Page 1 of 1
APPLICATION NO. : 10/385675
DATED              : January 19, 2010
INVENTOR(S)        : David Peterson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twenty-third Day of November, 2010

David J. Kappos
*Director of the United States Patent and Trademark Office*